(12) United States Patent
Danis et al.

(10) Patent No.: US 6,215,480 B1
(45) Date of Patent: Apr. 10, 2001

(54) DYNAMIC CYLINDRICAL DISPLAY FOR PEN-SIZED COMPUTING

(75) Inventors: Catalina M. Danis, Hastings-on-Hudson; John F. Kelley, Mahopac; William A. Nagy, New York, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/145,266

(22) Filed: Sep. 2, 1998

(51) Int. Cl.$^7$ ........................................................ G09G 5/00
(52) U.S. Cl. .................. 345/179; 345/184; 178/19.01; 178/18.01
(58) Field of Search .................................... 345/179, 184, 345/173, 174, 175, 176, 178, 180, 31; 178/18.01, 18.1, 19.01, 19.05, 19.02, 19.03, 19.04, 19.07, 19.06

(56) References Cited

U.S. PATENT DOCUMENTS

| | | | | |
|---|---|---|---|---|
| 5,301,222 | * | 4/1994 | Fujiwara | 345/179 |
| 5,600,348 | * | 2/1997 | Bartholow et al. | 345/179 |
| 5,850,059 | * | 12/1998 | Yishimura | 345/179 |
| 6,016,135 | * | 1/2000 | Biss et al. | 345/126 |

* cited by examiner

*Primary Examiner*—Vijay Shankar
*Assistant Examiner*—Mansour M. Said
(74) *Attorney, Agent, or Firm*—McGuireWoods, LLP; Stephen C. Kaufman, Esq.

(57) ABSTRACT

A computer dynamic cylindrical display provides a natural scrolling capability, giving the appearance of a much larger display in a very small size. The display encloses the electronics of the device and contains a simple weighted cam that senses roll (using rotation sensor much like in a mouse). When the cylinder is placed on a flat surface and rolled up and down, the pixel display scrolls in correspondence with the rolling movement, giving the visual feel of rolling a cylindrical magnifying glass across a finely printed document. A "snap-to" scrolling algorithm makes it easier for the user to stop right on the center of a line of text. Parallax algorithms compensate for the cylindrically wrapped text making it appear flatter. Twisting the cap adjusts the angle of presentation for when the user is not looking straight down onto the display. A touch sensitive overlay allows the user to select menu items or hypertext links as the display "rolls over" that line of text. The display also works without a flat surface (although not as naturally) by turning it while holding it in the air.

11 Claims, 2 Drawing Sheets

DYNAMIC CYLINDRICAL DISPLAY FOR PEN-SIZED COMPUTING

BACKGROUND OF THE INVENTION

1. Field of the Invention

The present invention generally relates to computer displays and, more particularly, to a naturally scrolling cylindrical display which gives the user the appearance of a much larger display in a very small size.

2. Background Description

Computing devices such as, for example, digital cellphones, pagers, pocket computers, and the like, are being made smaller and smaller due the higher densities of electronic packaging afforded by Very Large Scale Integrated (VLSI) circuits. The reduction in size of such devices, however, is limited by the traditional rectangular displays which require a certain amount of area to be effective. A "shirt pocket" computer does not really fit comfortably in a shirt pocket and probably never will because of this dilemma. A new type of computer display is needed to achieve the potential for even yet smaller computing devices.

SUMMARY OF THE INVENTION

It is therefore an object of the present invention to provide a new type of computer display which provides a natural scrolling capability, giving the appearance of a much larger display in a very small size.

According to the invention, there is provided a dynamic cylindrical display, enclosing the electronics of the device and containing a simple weighted cam that senses roll (using a rotation sensor much like in a mouse). The display itself may be a Liquid Crystal Display (LCD) or Organic Light Emitting Diode (OLED) display or other appropriate display technology. When the cylinder (about the size of a fat pen) is placed on a flat surface and rolled up and down, the pixel display scrolls in correspondence with the rolling movement, giving the visual feel of rolling a cylindrical magnifying glass across a finely printed document. A "snap-to" scrolling algorithm could make it easier for the user to stop right on the center of a line of text. Parallax algorithms could compensate for the cylindrically wrapped text making it appear flatter. Twisting the cap adjusts the angle of presentation for when the user is not looking straight down onto the display. A touch sensitive overlay allows the user to select menu items or hypertext links as the display "rolls over" that line of text. The display also works without a flat surface (although not as naturally) by turning it while holding it in the air.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
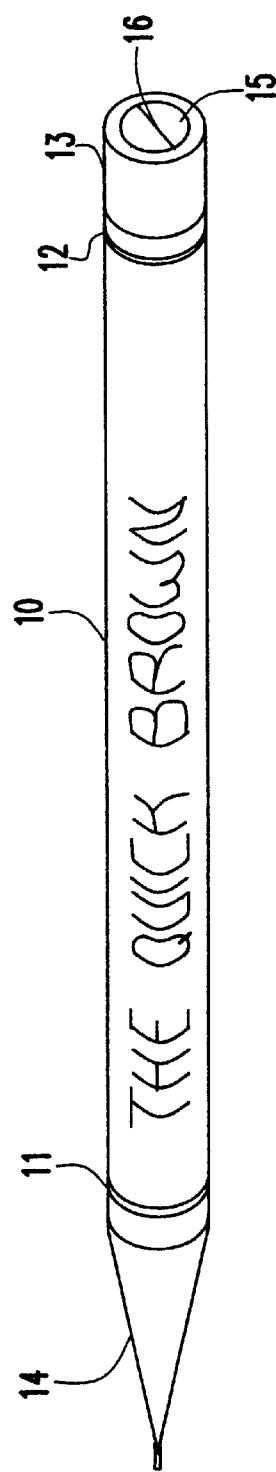
FIG. 1 is a pictorial diagram of a preferred embodiment of the display according to the invention.

Referring now to the drawings, and more particularly to FIG. 1, there is shown a pictorial representation of the cylindrical computer display according to the invention integrated in a pen-sized computer package. Such a package may be easily carried in a shirt pocket, for example. The example shown, might conveniently package a "shirt pocket" computer, a pager or similar device requiring a very small display.

The display comprises a cylindrical body 10 having at either end rubber O-rings 11 and 12 for traction to promote rolling on a flat surface rather than sliding. A slight knurling (e.g., bumps) on the rubber traction rings 11 and 12 can be provided to prevent the pen-like structure from rolling off a table or other substantially horizontal surface when the user takes his or her hand off the device. At one end, there is a visual angle adjustor knob in the form of a swivel end cap 13 which may be rotated by the user to adjust the viewing angle. At the other end, there may be provided and optional writing tip 14, giving both the appearance and functionality of a writing pen to the computing device. The swivel end cap 13 is provided with a screw in end cap 15 having a slot 16 which facilitates removal of the end cap 15 with a coin, such as a dime, in order to gain access to the battery chamber.

As shown by the text 17, the display may be viewed over approximately 180° of the cylindrical body 10 between the traction rings 11 and 12. As the body 10 is rolled, the text scrolls, displaying a next succeeding line or next preceding line of text depending on the direction of rotation. The display itself may be implemented using several technologies. LCDs and OLEDs can be made on a flexible substrate. It is also possible to implement the display in other than cylindrical form. For example, a flat LCD could be placed on a pivot inside a transparent tube and weighted so that it always points up. The electronics of the computing device and the display would be mounted on the back of such a flat LCD. As the tube is rolled across a flat surface, rotated in the user's hand, the rotation sensor causes the electronics to scroll the text up and down on the display. The display height and font size should enable showing a line of text plus some portion of the previous line and the next line for visual smoothness of scrolling.

Another alternative is to use a flat LCD mounted in a square or N-gonal cross-section tube with roller wheels on the ends. The use would hold the tube and roll it across a flat surface on its wheels and, as the wheels turn, the display would scroll as above.

User input to the device is preferably by means of the display screen itself. This is accomplished by touch screen technology of the standard capacitance overlay type. An alternative to a touch screen would be to have a single button incorporated into the battery cap 16. The effect of touching the button would be to send a "select" message to the application which would imply selecting the entire displayed row of text at the current position (CP). A convenient visual indicator to the user, such as horizontal >carets< would show which is the "Top" or "Current" line of text; i.e., that text which would be selected if the button were pushed.

If sufficiently high resolution were chosen for the display, the "lens effect" (or rolling glass cylinder over a page of text) could be enhanced by "magnifying" the text nearest the gravitational top or visual center (as offset by the viewing angle adjustor knob 13. This effect could be obtained by programming the "display scan lines" function to drop scan lines with increasing frequency away from the visual center. Depending on the effect desired, a logarithmic or trigonometric function could be used, although for best performance, a fixed lookup table might be used. An example would be to drop scan lines which are a distance of 100, 190, 270, 340, 400, 350, 390, 420, 440, 450, 455, 453 pixels away from the visual center in either direction. Best results would be obtained by empirically adjusting this distribution (using experimental observations) after the display is manufactured.

Another adjustment to the logic which could be empirically derived would be the "gain"; i.e., how much "N" delta to apply to the CP for each increment of rotation. This could also be made adjustable by the user if a control program (with menus) were incorporated into the device Oust like some operating systems which allow user adjustment of the "gain" of the mouse).

Figure 2:
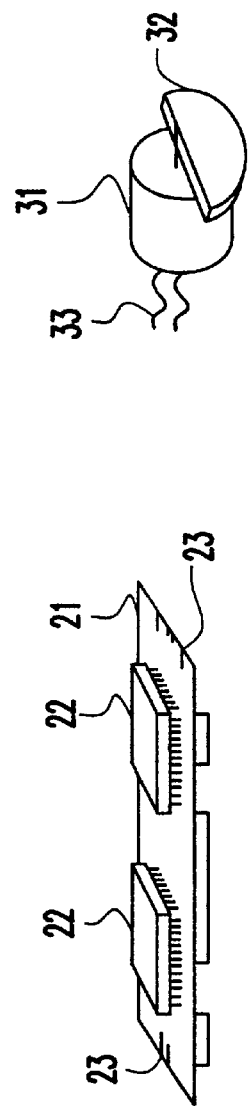
FIG. 2 is a pictorial diagram of typical electronics packaging contained within the display shown in FIG. 1.

The body 10 is hollow and encloses the electronics for the computing device and the display. FIG. 2 shows a typical packaging of the electronics. This packaging includes a printed circuit board (PCB) 21 on which one or more integrated circuits (ICs) 22 are mounted. The PCB 21 has a width approximately equal to the internal diameter of the body 10. The PCB 21 also includes terminals 23 for making connections to input and output (I/O) circuits, one of these being the display.

Figure 3:
FIG. 3 is a pictorial diagram of a mouse-type rotation sensor mounted within the display shown in FIG. 1.

FIG. 3 shows a mouse-type rotation sensor 31 having a weighted cam 32. This sensor is mounted within the hollow body 10 of the display and connected by means of electrical leads 33 to the PCB 21, providing an input to the electronics controlling the display. As the display is rotated, the weighted cam causes the sensor mechanism to rotate internally and generate an output to the display electronics. This, in turn, causes the display to scroll according to the direction and speed of the rotation. If the rotation sensor 31 is a relative rotation sensor, like a stepper motor, then the device will have to be "reset" whenever the power is interrupted (i.e., when batteries are changed). If a touch screen is used, this could be as simple as touching the visual center of the display when prompted; otherwise, the visual angle adjustor knob 13 would have to be twiddled when the batteries are changed. If an absolute rotation sensor (perhaps incorporating an optical sensor) is used for rotation sensor 31, this would not be necessary.

Figure 4:
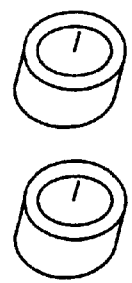
FIG. 4 is a pictorial diagram of batteries of the type used to power the computing device and the display.

Both the display and the electronics of the computing device can be powered by small cylindrical batteries, of the type commonly used in cameras and watches, as generally shown in FIG. 4. The end cap 15 when removed provides the access to the battery chamber, allowing the batteries to be inserted and removed as needed.

Figures 5, 5A:
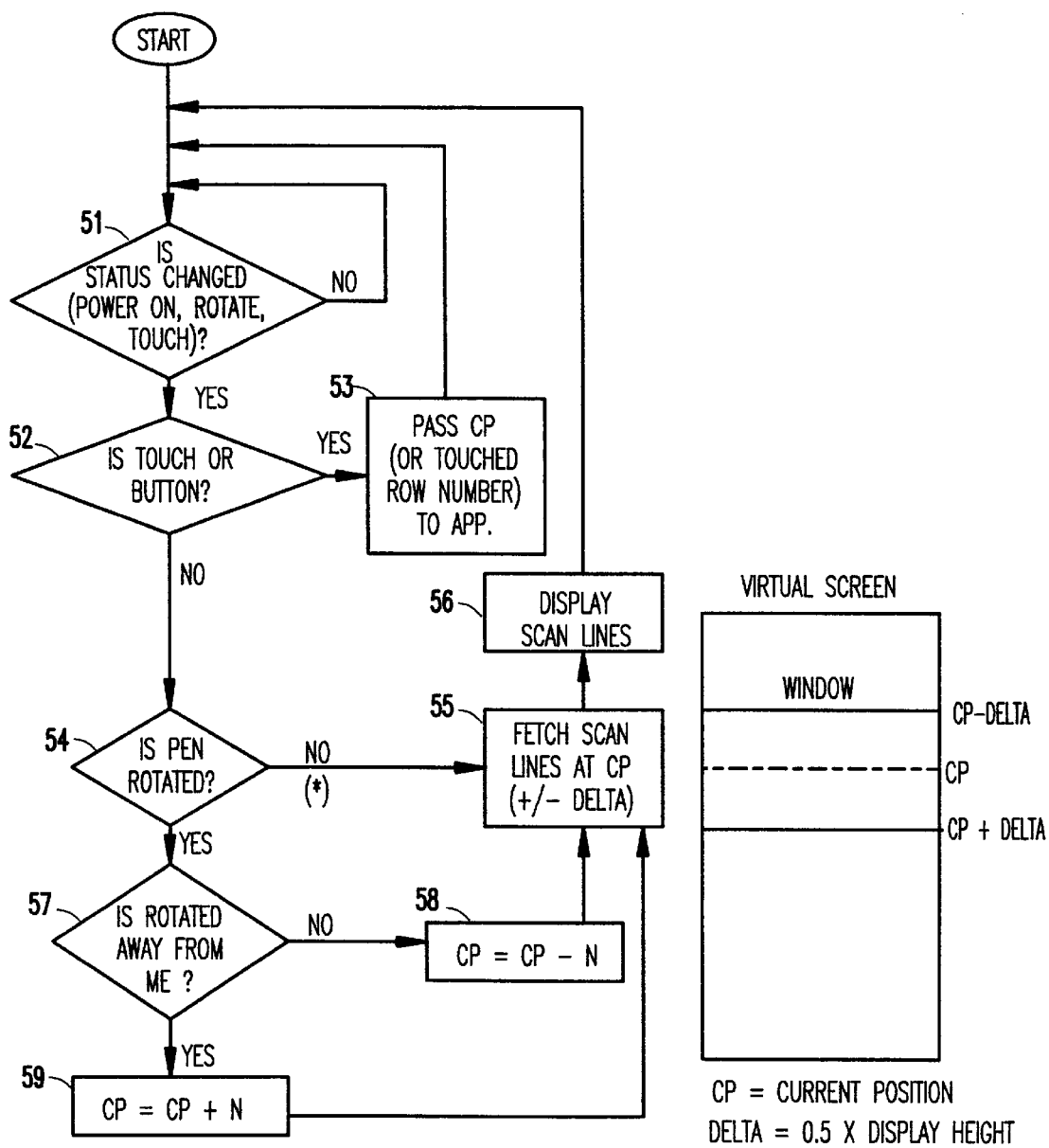
FIG. 5 is a flow diagram showing the logic of the display algorithms implemented in the display electronics.
FIG. 5A is a diagram of the virtual display screen useful in understanding the process of the FIG. 5.

The flow diagram of the display/touch logic implemented by a preferred embodiment of the invention is shown in FIG. 5. In this process, the output from the weighted rotation sensor 31 tells the "display scan lines" function where to insert the "CP" scan line (i.e., the gravitational top or visual center of the display, perhaps offset by some delta controlled by the viewing angle adjustor knob 13). This is illustrated by the virtual screen shown in FIG. 5A. Scan lines above and below the CP are displayed in turn around to the back of the device where there would be an unseen "seam" along the line where the top and bottom come together.

With specific reference to FIG. 5, the process begins with decision block 51 which checks to determine if the status of the device has changed; e.g., power is turned on, the device has been rotated, the touch screen has been touched, etc.). If not, the process loops back to await a status change. When a status change is detected, a test is made in decision block 52 to determine if the change is a touch or button press. If so, the CP (or touched row number) is returned to the application in function block 53, and the process loops back to await the next status change.

If the status change is not a touch or button press, then a test is made in decision block 54 to determine if the device has been rotated. If not, a process is called in function block 55 to fetch scan lines at CP (plus or minus a delta). The fetched scan lines are then passed to a display function in function block 56. Note that the condition which calls the fetch scan lines function occurs only at power-on. This is also a good time to do any power-on calibrations that may be required.

Assuming that the device is rotated, a test is done in decision block 57 to determine if the device is rotated away from the user. If not, the CP is reduced by a factor of "N" in function block 58, where again "N" is the "gain" to be applied to the delta of the CP (current position). If the device is rotated away from the user, then the CP is increased by a factor of "N" in function block 59. In either case, the new value of CP is passed to function block 55 to fetch scan lines at the new CP.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer dynamic cylindrical display comprising:
   a hollow cylindrical body having an outer surface which displays one or more lines of text;
   electronics of a computing device and the display mounted within the hollow cylindrical body and supporting an application running on the electronics of the computing device; and
   a weighted cam sensor mounted within the hollow cylindrical body that senses roll of the hollow cylindrical body and provides an input to the electronics of the display, the electronics of the display causing the display to provide a natural scrolling capability, giving the appearance of a much larger display in a very small size so that when the hollow cylindrical body is placed on a flat surface and rolled, the display scrolls in correspondence with the rolling movement, giving the visual feel of rolling a cylindrical magnifying glass across a finely printed document.

2. The computer dynamic cylindrical display recited in claim 1 wherein the display is implemented with a liquid crystal display device.

3. The computer dynamic cylindrical display recited in claim 1 wherein the display is implemented with an organic light emitting diode display device.

4. The computer dynamic cylindrical display recited in claim 1 further comprising a swivel end cap at one end of the hollow cylindrical body connected to the electronics of the display for adjusting a viewing angle of the display.

5. The computer dynamic cylindrical display recited in claim 1 wherein the weighted cam sensor is an absolute rotation sensor.

6. The computer dynamic cylindrical display recited in claim 1 wherein the weighted cam sensor is a relative rotation sensor, further comprising means for resetting the display after a power interruption.

7. The computer dynamic cylindrical display recited in claim 1 wherein the outer surface which displays one or more lines of text includes a touch screen overlay to provide a user input to an application running on the electronics of the computing device.

8. The computer dynamic cylindrical display recited in claim 1 further comprising a button which, when pressed, provides a user input for selecting a line of text at a current position of display.

9. A pen-sized computer having a dynamic cylindrical display comprising:

- a hollow cylindrical body having an outer surface which displays one or more lines of text or data;
- a liquid crystal display device incorporated into the outer surface of the hollow cylindrical body;
- electronics of a computing device and the display device mounted within the hollow cylindrical body and supporting an application running on the electronics of the computing device; and
- a weighted cam sensor mounted within the hollow cylindrical body that senses roll of the hollow cylindrical body and provides an input to the electronics of the display, the electronics of the display device causing the display to provide a natural scrolling capability, giving the appearance of a much larger display in a very small size so that when the hollow cylindrical body is placed on a flat surface and rolled, the display scrolls in correspondence with the rolling movement, giving the visual feel of rolling a cylindrical magnifying glass across a finely printed document.

10. The pen-sized computer recited in claim 9 wherein the weighted cam sensor is an absolute rotation sensor.

11. The pen-sized computer recited in claim 9 wherein the weighted cam sensor is a relative rotation sensor.

* * * * *